Jan. 25, 1966  E. VALENTE  3,230,974
ALTERNATELY SEATING VALVES
Filed Sept. 25, 1961

INVENTOR:
ERNESTO VALENTE
BY K.H. Mayr
ATTORNEY

United States Patent Office 3,230,974
Patented Jan. 25, 1966

3,230,974
ALTERNATELY SEATING VALVES
Ernesto Valente, Via G. Ventura 5, Milan, Italy
Filed Sept. 25, 1961, Ser. No. 140,609
Claims priority, application Italy, Sept. 24, 1960,
16,620/60
2 Claims. (Cl. 137—627.5)

There are already known coffee making machines where the water infusion is available at a temperature ideal for obtaining "creamy coffee" and with a pressure sufficient for forcing said water across the dose of coffee powder contained and compressed in the filter.

In this manner the distributing device acts as a simple cock with 3 outlets, fitted for connecting the infusion chamber with the container of the water infusion and alternatively with the outlet.

But such machines present the inconvenience that the water infusion rapidly permeates and crosses the dose of coffee powder, and does not allow sufficient time for the preparation of the infusion, while, on the contrary, this is possible particularly with devices with a piston which can be operated by hand.

The present invention removes the above mentioned inconvenience, allowing a desired interval of infusion between the opening of the cock and the distributing of the drink.

An embodiment of the device of the present invention will be described, by way of example, in the accompanying drawing, in which.

Figure 2:
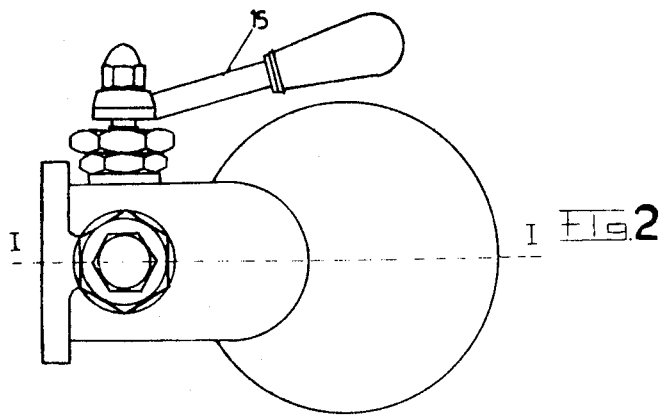
FIG. 2 is a view from the top of the device, assumed to be mounted on the machine.
Figure 1:
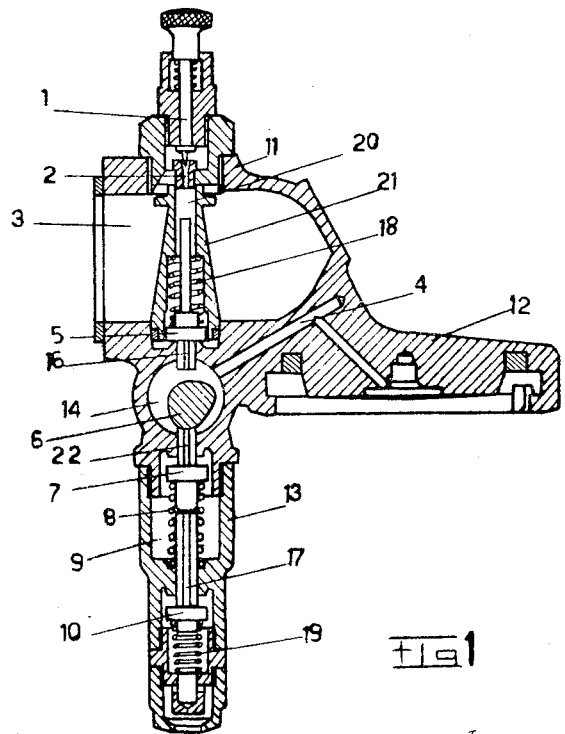
FIG. 1 is a vertical sectional view, taken along the line I—I of FIG. 2.

With reference to the drawing, the hollow body 11 of the distributing head illustrated, the cavity 3 of which represents an integral part of the container of pressure hot water infusion, is provided with the usual prolongation, shaped as a bell, serving as a support 12, intended to receive the filter carrier having therein a filter (not shown in the drawing) and is also provided with a substantially tubular downwardly-extending prolongation 13. In the body 11 is formed a chamber 14, which is connected with the infusion chamber, below the bell (not shown in the drawing), by means of the conduits 4, and in said chamber there is rotatably supported a cam 6, which can be operated from outside by means of the handle 15.

Said cam 6 is intended to alternatively cooperate with the stem guide 16 and 17, respectively, of the sealing device 5, which is kept against its own seat by the spring 18, and of the sealing device 10, which, in its turn, is kept against its own seat by the spring 19.

The sealing device 5, its corresponding seat and the spring 18 are located in a chamber 20, formed in a body 21 which is disposed, watertight, in the cavity 3 of the body 11.

Said chamber 20 communicates with the cavity 3 only by means of an opening 2, in which is engaged a cleaning pin 1, which may be operated by pressure from the outside.

A third sealing device 7, on the same axis as the sealing device 10, is kept against its seat by a spring 8, and in this manner intercepts the communication between the chamber 14 and a chamber 9 of a predetermined volume.

The communication between chamber 9 and the outlet is intercepted by the sealing device 10, cooperating with its own seat.

The stem guide 17 does not directly cooperate with the cam 6, but only by means of the stem guide 22 of the sealing device 7, which extends, like the stem 16, towards the chamber 14, in which is found the cam 6. While the two sealing devices are in operative position (as shown in the drawing) there is a continuity between the two stems, with the lower end of the stem 22 pressing against the upper end of the stem 17. But, while the two sealing devices are in off position, there is no such continuity.

On the other hand, the spring 8 is regulated in such manner that, in practice, the sealing device 7 opens under a pressure of 1.5 atm., while the sealing device 10 opens under a pressure near to 7 atm. The cam 6 kinematically opens both the sealing devices.

The system of operation is as follows:

In the drawing the device is represented with the cam in the position of open outlet. In such a position the cam presses against the stem 22, overcoming the power of the spring 8. The sealing device 7 is raised over its seat. For reasons of continuity, it also presses the stem 17, so that the sealing device 10 is in operative position. Now, we suppose that the cavity 3 is connected with the container of pressure hot water.

For obtaining coffee, it is necessary to apply to the bell 12 the filter carrier, containing a filter, containing the dose of coffee powder.

By turning the handle 15, the cam receives a rotation of 90°. Thus, said cam no longer presses the stems (17, 22) and therefore the sealing devices 7 and 10 close. But said cam, now, presses against the stem 16, so that the hot water crosses the opening 2, falls into the chamber 20, floods the chamber 14 and then, by means of the conduits 4, steeps the coffee powder contained in the filter.

In practice, during some moments, there is no pressure. Then, the pressure begins to be formed. When the pressure in the chamber 14 reaches (in the case in question) 1.5 atms. this pressure overcomes the power of the spring 8 and the sealing device 7 becomes detached from the seat. But in the supposition in question, the sealing device 10 remains in off position. As the hot water still arrives in 14, this water, little by little, fills the cavity 9. After this filling, the pressure in 14 and above the coffee powder contained in the filter, rapidly increases under the action of the pressure in 3, and then the infusion is distributed. After this distribution, by operating the handle 15 in the opposite manner, the starting conditions are reestablished.

It is evident that, by regulating the opening 2, the spring 8, and the volume of the chamber 9, it is possible to obtain the desired period of the phase of infusion with the desired pressure of infusion.

I claim:

1. A distributing head for a coffee-making machine comprising a body having a first chamber adapted to be connected to a source of hot water under pressure for infusion, a projection on said body for connection to a bell defining an infusion chamber containing a body of ground coffee in operation, said body comprising a second chamber having a cam disposed therein, said cam being connected to a manually-operable handle and being movable between a first position and a second position, means defining a first conduit for connecting said first chamber with said second chamber, said first conduit having a first inlet orifice communicating with said first chamber and a first outlet orifice communicating with said second chamber, first valve means for controlling flow through said outlet orifice and said valve means being positioned to be actuated by said cam to displace it from said outlet orifice when said cam is in said first position, means defining a third chamber in said body having a second inlet orifice communicating with said second chamber, second valve means for closing said second inlet orifice, said second valve means being positioned to be unseated to open said second inlet orifice when said cam is in said second position, an outlet conduit leading from said second chamber to the first-named outlet on said projection for application of hot water under pressure to the infusion chamber in operation, and an adjustable needle valve for varying the size of said first inlet orifice.

2. A distributing head for a coffee-making machine comprising a body having a first chamber adapted to be connected to a source of hot water under pressure for infusion, projection on said body for connection to a bell defining an infusion chamber containing a body of ground coffee and having an outlet to communicate with said body of ground coffee in operation, said body comprising a second chamber having a cam disposed therein, said cam being connected to a manually-operable handle and being movable between a first position and a second position, means defining a first conduit for connecting said first chamber with said second chamber, said first conduit having a first inlet orifice communicating with said first chamber and a first outlet orifice communicating with said second chamber, first valve means for controlling flow through said outlet orifice and said valve means being positioned to be actuated by said cam to displace it from said outlet orifice when said cam is in said first position, means defining a third chamber having a second inlet orifice communicating with said second chamber and having a second outlet orifice, second valve means for closing said second inlet orifice and third valve means for closing said second outlet orifice, said second valve means being positioned to be unseated to open said second inlet orifice when said cam is in said second position, said third valve means being positioned to be actuated to open said second outlet conduit when said second valve is unseated, and a third outlet conduit leading from said second chamber to the first-named outlet on said projection for application of hot water under pressure to the infusion chamber in operation, spring means for each of said valve means loading each of said valve means in the direction of closing, said third valve means being under a higher spring load than said second valve means, and an adjustable needle valve for varying the size of said first inlet orifice.

References Cited by the Examiner
UNITED STATES PATENTS

| 1,144,758 | 6/1915 | Desmond | 137—627.5 |
| 1,980,752 | 11/1934 | Eskilson | 251 |
| 2,947,532 | 8/1960 | Christensen | 137—627.5 X |

FOREIGN PATENTS

| 66,418 | 10/1956 | France. |
| 1,059,209 | 10/1956 | France. |

ISADOR WEIL, *Primary Examiner.*

WILLIAM F. O'DEA, J. O'NEILL, *Assistant Examiners.*